United States Patent [19]

Laska et al.

[11] 4,291,972
[45] Sep. 29, 1981

[54] PHOTOGRAPHIC REPRINT SYSTEM WITH LARGE PRINT QUANTITY VERIFICATION

[75] Inventors: Ronald C. Laska, Minnetonka; Janis Pone, Minneapolis, both of Minn.

[73] Assignee: Pako Corporation, Minneapolis, Minn.

[21] Appl. No.: 109,821

[22] Filed: Jan. 7, 1980

Related U.S. Application Data

[63] Continuation-in-part of Ser. No. 23,521, Mar. 23, 1979, abandoned.

[51] Int. Cl.$^3$ .............................................. G03B 27/52
[52] U.S. Cl. .................... 355/40; 355/14 CU; 355/50; 355/112
[58] Field of Search ............... 355/518, 14 R, 41, 40, 355/38, 50, 51, 97, 45, 112, 14 C, 14 CU; 53/55

[56] References Cited

U.S. PATENT DOCUMENTS

| | | | |
|---|---|---|---|
| 3,447,871 | 6/1969 | Neale | 355/18 |
| 3,765,758 | 10/1973 | Jackson et al. | 355/5 |
| 3,888,580 | 6/1975 | Amano et al. | 355/38 |
| 3,947,110 | 3/1976 | Yamada | 355/38 |
| 4,039,258 | 8/1977 | Hujer et al. | 355/38 X |
| 4,115,981 | 9/1978 | Hell et al. | 53/55 |
| 4,128,330 | 12/1978 | Fergg et al. | 355/40 X |
| 4,150,894 | 4/1979 | Meyer et al. | 355/38 |

*Primary Examiner*—Richard A. Wintercorn
*Attorney, Agent, or Firm*—Kinney, Lange, Braddock, Westman and Fairbairn

[57] ABSTRACT

A photographic reprint system includes a preparation station at which film segments or strips are attached to an elongated paper tab. Holes are punched in the tab to indicate the location of each film frame to be printed. Information relating to the printing of each film frame, including the desired print quantity, is stored sequentially in a storage medium, such as a floppy disk. In addition, the desired print quantity is printed in human readable form on the tab. After the tab with attached film segments has been prepared, it is taken to a photographic printer, where the tab with the attached film segments is advanced sequentially and the negatives are printed. Prior to the printing of each film frame, the desired print quantity which was stored in the storage means is retrieved and displayed. If the desired print quantity exceeds a predetermined number of prints, the printer waits for verification from the operator before printing. This permits the operator to check the desired print quantity being displayed with the print quantity which has been printed on the tab, to check the desired print quantity with the print quantity indicated on the original order form or order envelope, and to check the film frame to make certain that it is clean and in printable condition. The operator then provides either a signal initiating printing of the desired print quantity, or a signal which causes the printer to pass the film frame without printing. Alternatively, the operator may cause a different quantity to be made.

20 Claims, 9 Drawing Figures

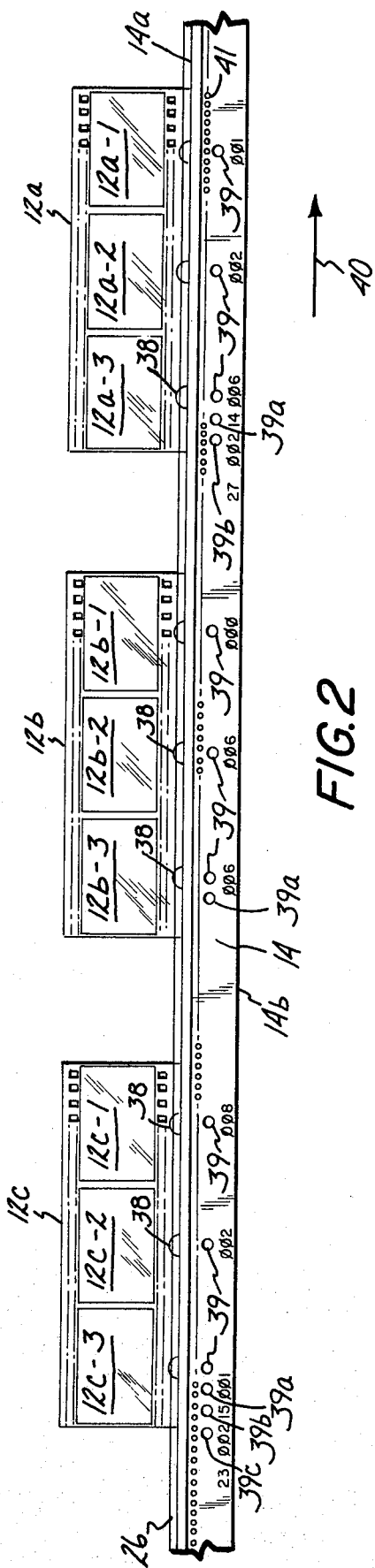
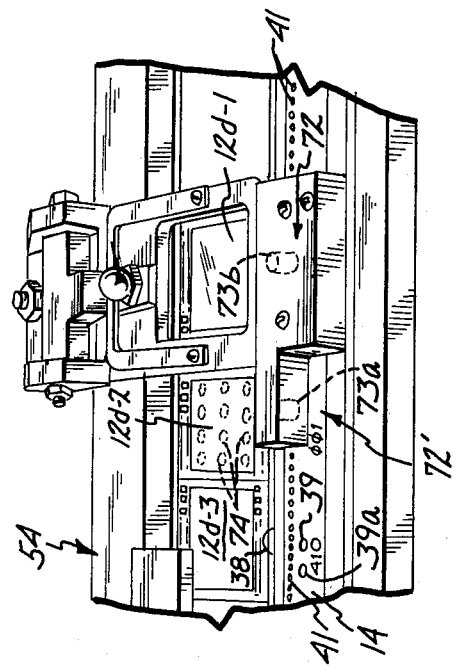
FIG. 2
FIG. 4

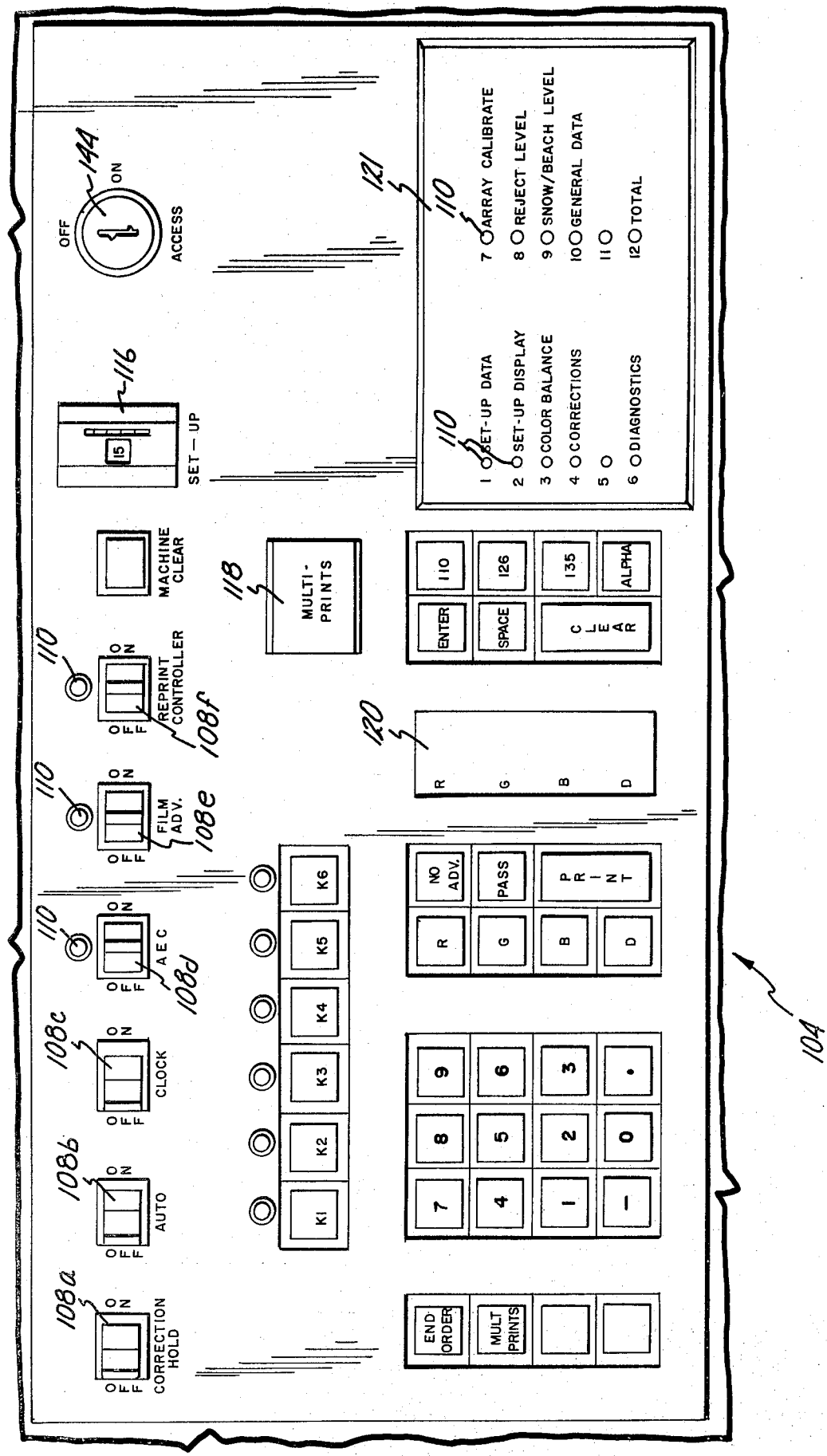

PHOTOGRAPHIC REPRINT SYSTEM WITH LARGE PRINT QUANTITY VERIFICATION

REFERENCE TO CO-PENDING APPLICATIONS

The present application is a continuation-in-part of U.S. patent application Ser. No. 023,521, filed Mar. 23, 1979 by Ronald B. Harvey, Janis Pone, and Ronald C. Laska, and Francis M. Laciak now abandoned, which is assigned to the same assignee as the present application.

Reference is also made to the following U.S patent applications, all of which are assigned to the same assignee as the present application, are filed on even date with this application, and are continuations-in-part of the above-mentioned application Ser. No. 023,521: Ser. No. 109,823, entitled "Photographic Reprint System with Dual Indicia Sensor for Synchronization Recovery"; Ser. No. 109,822, entitled "Photographic Reprint System with Reprint Neghold Indication"; Ser. No. 109,824 entitled "Photographic Reprint System with Film Size Code Comparison"; and Ser. No. 109,825 entitled "Photographic Reprint System with Information Display".

BACKGROUND OF THE INVENTION

1. Field of the Invention

The present invention relates to photographic printing systems. In particular, the present invention is a photographic reprint system which allows the operator to verify correctness of the desired print quantity of prints from a particular film frame if the desired print quantity which was previously stored exceeds a predetermined number.

2. Description of the Prior Art

In commercial photographic processing operations very high rates of processing must be achieved and maintained in order to operate profitably. In order to permit efficient automatic processing, orders containing films of similar type and size are typically spliced together for developing. As many as 500 to 1,000 rolls of twelve, twenty, twenty-four, and thirty-six exposure film of the same type and size may be spliced together for processing and printing purposes.

After developing, the photographic images contained in the film originals (generally negatives) are printed in an edge-to-edge relationship on a continuous strip of photosensitive paper by a photographic printer. The photographic printer causes high intensity light to be passed through the negative and imaged on the photographic print paper to expose the photographic emulsion layers of the paper. The print paper is subsequently processed to produce a print of the image contained in the negative.

This type of large-scale production is well suited to original or first-run production of photographic prints in which the film may be spliced to form a continuous roll. In the past, however, it has not been particularly well suited to production of reprints, where the customer has already received prints and has decided that he wishes to have additional prints made of certain negatives. Unlike first-run production, making of reprints has typically not been highly automated.

There are several reasons why reprints require special, less efficient handling. First, when reprints are ordered, the negatives generally have already been cut into short segments of three or four frames each, which are more difficult to handle than the longer film strips encountered in first-run production printing. Second, the customer may only desire reprints from one frame of a particular segment. This is unlike first-run production, in which a print is typically made from every printable negative on the strip. Third, often multiple prints rather than just a single print are desired from one or more negatives on a segment. Fourth, no extra non-printing area on the film is normally available to which a splice may be made. Fifth, reprints are requested from a much wider variety of film types than are typically encountered in first-run production. Sixth, color and/or density corrections may be required to produce a satisfactory print.

Because of these problems, making of reprints has often been handled on a manual or semi-automatic basis, and often on a different printer from the high speed first-run production printers on which it may be impossible to reproduce identical print color balance and density corrections. Also dust and dirt from handling the negatives on a manual basis can degrade print quality. As a result, the quality of reprints often differs from first-run production prints. The lower quality of reprints in comparison to first-run production prints is a source of customer dissatisfaction.

In order to overcome some of the problems of making reprints, and to provide more efficient automated printing of reprints systems have been developed in which the individual segments of negatives from which reprints are to be made are temporarily attached to a long paper strip or "tab". The "tabbing" of negatives to be reprinted is performed at an "order entry" of "preparation" station, where indicia (typically in the form of punched holes) are formed in the tab adjacent the frames of the negatives. These holes are used as frame location indicators and also provide frame status information. For example, in one system the number of holes may vary from one to four, with the first hole always indicating the frame location, while multiple holes provide the frame status information to allow the printer system to maintain synchronization of reprint data with the tabbed film material. In this system, a single hole designates a frame location, two holes at a frame signify the end of a film strip, three holes at a frame indicate the end of a customer order, and four holes at a frame indicate the end of a reel. In this type of system, a data entry device and a data storage device at the preparation station are used by the operator to store for each frame the number of holes in the tab, print quantity, and density/color corrections, and setup number.

In a typical automated reprint system, a photographic printer includes sensors for sensing the indicia on the paper tab in order to sense the location of each frame to be printed. The data stored in the memory device for that particular frame is transferred to the photographic printer, and the required number of reprints, if any, from that frame are then produced.

As stated previously, customers often order multiple reprints, and therefore an automated reprint system must have the capability of automatically producing multiple reprints from a single film frame. In some cases, the desired number of reprints can be very large, and the reprint system must be capable of printing large numbers of reprints from a single film frame. If a human or machine error is made in storing the required number of reprints or in retrieving the stored number, of if the film frame is dirty or for some other reason cannot be printed properly, a large number of wasted prints will be produced. This is very expensive in terms of both wasted materials and wasted production time.

SUMMARY OF THE INVENTION

The present invention is a photographic reprint system which prevents waste due to the incorrect printing of large numbers of reprints caused by a human error in entering print quantities, a machine error in storing or retrieving the proper print quantity for a particular film frame, or due to dirt on the film frame or other factors which would cause unacceptable prints to be made from the film frame. In the present invention, an operator is allowed to verify the desired print quantity and correct printing conditions if that print quantity exceeds a predetermined number.

The system of the present invention includes a preparation station and a photographic printer. At the preparation station, the film segments are connected to an elongated tab. The preparation station includes means for storing desired print quantities for the film frames and means for printing the desired print quantities in human readable form on the tab proximate the film frames.

The photographic printer includes means for sequentially advancing the elongated tab and the film segments to a print gate at which photographic prints are printed. The stored desired print quantities are sequentially retrieved, and the desired print quantity for the film frame is displayed. If the desired print quantity exceeds a predetermined number, the printer stops and requires the operator to intervene, allowing him to check the desired print quantity being displayed with the print quantity which was printed on the tab, to check the desired print quantity with the print quantity indicated on the original order form or order envelope, and to check the film frame to make certain it is clean and in printable condition.

In one embodiment of the present invention, display means display a message to the operator when the desired print quantity exceeds the predetermined number. After verification of the print quantity and checking of the film frame to make certain that it is clean and in printable condition, the operator may actuate either a first operator controlled means which provides a signal to the printer to print the desired print quantity of photographic prints from the film frame, or a second operator controlled means which provides a signal to the printer to pass the film frame without printing the desired print quantity.

In addition, means may be provided which permit the operator to enter a corrected print quantity. This permits the operator to cause the printer to print the correct number of reprints in the event that the operator has discovered that an erroneous desired print quantity is being displayed.

BRIEF DESCRIPTION OF THE DRAWINGS

FIG. 2 shows a portion of a paper tab with film segments attached.

FIG. 4 is a perspective view of portion of the neghold assembly of the photographic printer of FIG. 3.

FIG. 6 is a view of the operator control panel of the photographic printer of FIG. 3.

DETAILED DESCRIPTION OF THE PREFERRED EMBODIMENTS

Figure 1:
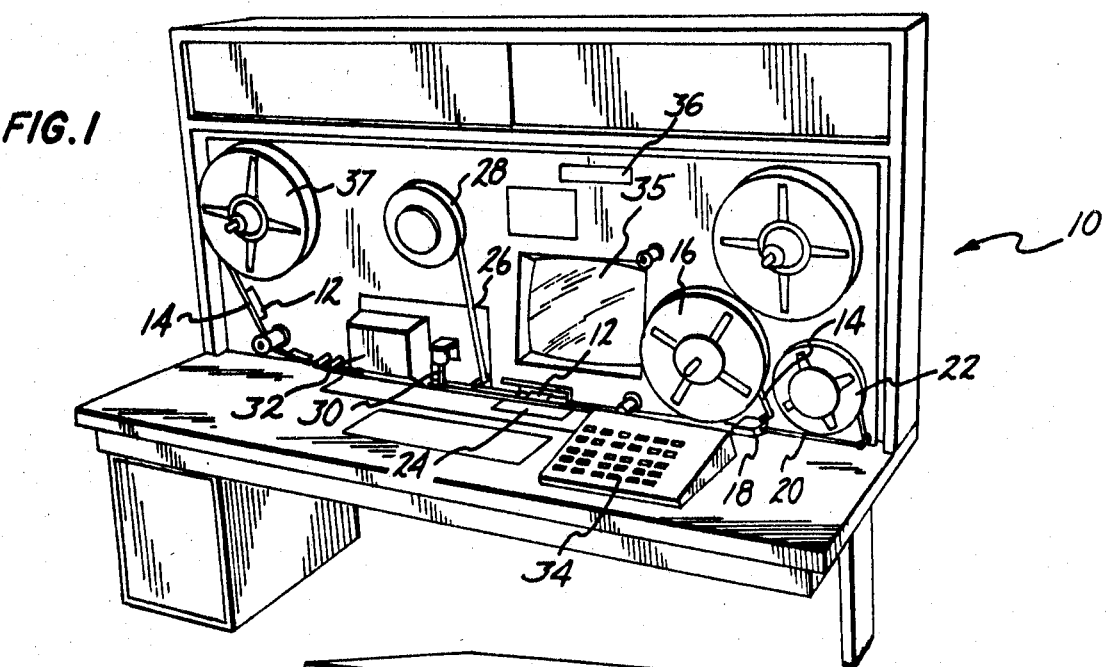
FIG. 1 is a perspective view showing the reprint film preparation station, at which strips or segments of films are attached to a paper tab, and at which data is stored relating to each frame.

FIG. 1 shows reprint film preparation station 10, at which segments of strips of photographic film 12 are attached to a paper strip or tab 14. As shown in FIG. 1, paper tab 14 is fed from reel 16 and under roller 18, where first transparent adhesive tape 20 is attached to the underside of tab 14. First tape 20 is supplied from reel 22, as shown in FIG. 1. The one edge of first tape 20 is exposed, and is used for attaching film segments 12 to paper tab 14 at mounting station 24. After film segments 12 are attached at mounting station 24, second transparent adhesive tape strip 26, which is fed from reel 28, is applied to the top surface of the junction between film segment 12 and paper tab 14. The use of first and second transparent tape strips 20 and 26 at top and bottom provides a more secure fastening of film segment 12 to paper tab 14.

After film segment 12 has been attached to paper tab 14, it advances to a marking station, at which punch holes are produced by paper punch 30. These holes are punched in paper tab 14 and indicate both the frame location and frame status information. A single hole punched in paper tab 14 indicates the location of a frame. Two holes at a frame signify both frame location and the end of a film segment. Three holes indicate a frame location, the end of a film segment, and the end of an order. Four holes indicate the location of a frame, the end of a film segment, the end of an order, and the end of the reel. Paper tab 14 and film segment 12 then advance to a paper printer 32, which prints human readable information on paper tab 14 adjacent the strip or a particular frame. In particular, paper printer 32 prints the order number adjacent the end of each order, the desired print quantity for each frame adjacent that frame, the total number of prints in each order at the end of each order, and other useful management information at the end and beginning of a reel.

Control of the operation of paper punch 30 and paper printer 32 is provided through data entry console 34. The operator of the preparation station enters, through console 34, information which is needed in the printing of prints from each frame. This information includes the end of strip, order, or reel information which determines the number of holes which should be sensed in tab 14 adjacent the frame, print quantity for that frame, and density/color correction for that frame, and the color balance setup to be used in printing reprints from that frame. The information entered through console 34 is displayed on data display 35 and is stored on a memory medium, such as a floppy disk, in controller/disk drive 36.

As shown in FIG. 1, tab 14 with attached film segments 12 is wound onto take-up reel 37. Prior to printing, tab 14 and segments 12 preferably are rewound onto a supply reel of a printer.

FIG. 2 shows an example of a portion of paper tab 14 with three film strips or segments 12a, 12b and 12c attached. Segments 12a, 12b and 12c are 135 size photographic film, and each film segment includes three frames. The three frames of segment 12a are designated 12a-1, 12a-2, and 12a-3. Similarly, the three frames of segment 12b are designated 12b-1, 12b-2, and 12b-3, and the three frames of segment 12c are designated 12c-1, 12c-2, and 12c-3.

As shown in FIG. 2, segments 12a, 12b and 12c are attached to edge 14a of tab 14 by top layer of tape 26, and by bottom layer of tape 20 (not shown). The semicircular indexing holes or notches 38 characteristic of 135 size film are located near the edges of segments 12a, 12b and 12c which are closest to edge 14a of tab 14. Unlike first-run production printing in this particular embodiment, notches 38 do not control the positioning of the individual film frames in the print gate of the printer. Instead, frame location is indicated by holes 39 in tab 14, which are located below the center of each frame. As will be discussed in detail later, the printer has sensors which sense holes 39 in order to properly position each frame in the print gate of the printer and to count the holes for synchronization purposes.

As shown in FIG. 2 below frame 12a-3 there are three holes 39, 39a and 39b. Hole 39 indicates frame location of frame 12a-3, and the presence of a total of three holes designates that this is the end of a segment and also the end of an order. Located below frame 12b-3 are two holes 39 and 39a. Once again, hole 39 indicates frame location of frame 12b-3, while the presence of two holes (39 and 39a) indicates that this frame is the final frame of segment 12b. Located below frame 12c-3 are four holes 39, 39a, 39b and 39c. Once again, hole 39 designates the frame location of frame 12c-3, while the additional holes 39a, 39b and 39c indicate that frame 12c-3 is at the end of the reel. In other words, there are no further segments attached to tab 14.

Arrow 40 shown in FIG. 2 indicates the direction of travel of the tab 14 and attached segments 12a, 12b and 12c when placed in a photographic printer. In the preparation station shown in FIG. 1, the direction of travel of tab 14 is from right to left, rather than from left to right. As a result, when segments 12a, 12b and 12c are initially attached at film preparation station 10, edge 14b of tab 14 is furthest from the operator, and edge 14a is closest to the operator.

As shown in FIG. 2, tab 14 also includes a longitudinal row of small holes 41 which are located above frame indicating holes 39. Holes 41 are indexing holes for tab 14 as it is advanced through the preparation station. Holes 41 are not used, however, during the photographic printing operation.

As shown in FIG. 2, certain information is printed on tab 14 near edge 14b. A three digit number is printed below each frame indicating hole 39. This three digit number, which can range from "000" to "999" indicates the desired print quantity from the frame indicated by frame indicating hole 39. In the example shown in FIG. 2, the desired print quantities for frame 12a-1 is "001", the desired print quantity for frame 12a-2 is "002", and the desired print quantity for frame 12a-3 is "006".

Generally below frame 12a-3 are a five digit number "00214" and a multiple digit number "27". The five digit number indicates the order number to which the preceding film segments belong. In the example shown, segment 12a, together with at least one other segment (not shown), form order number 214. The numeral "27" indicates that there were twenty-seven total prints in order number 214. The order number and the total number of prints are only printed on tab 14 when three or more holes are present.

Frames 12b and 12c form the next order, order number 215. In the example shown, frame 12b-1 has zero prints desired, frame 12b-2 has six prints desired, and frame 12b-3 also has six prints desired. In segment 12c, frame 12c-1 has a desired print quantity of eight, frame 12c-2 has a desired print quantity of two, and frame 12c-3 has a desired print quantity of one. Printed below holes 39b and 39c are the five digit number "00215" indicating that segments 12b and 12c form order number 215. The number "23" immediately to the left of the order number indicates that there are a total of twenty-three prints desired in order number 215.

In one typical embodiment, paper printer 32 also prints a variety of useful management information at the end of the tab after end of reel indicating hole 39c. This information (not shown in FIG. 2) may include, for example, the elapsed time in preparing the reel, the film size, the printer number, the total number of orders attached, the total number of prints requested, the operator number of the operator who prepared the tab and film segments, the total number of strips or segments attached, the floppy disk number, and the date of preparation.

Figure 3:
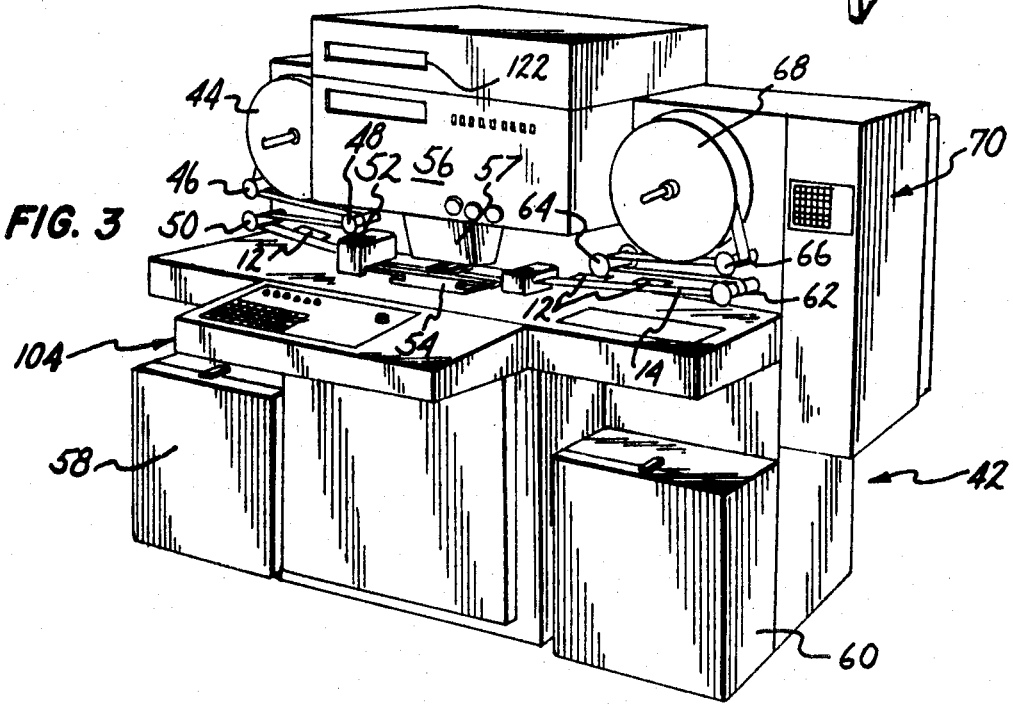
FIG. 3 is a perspective view of a photographic printer used in producing photographic reprints.

FIG. 3 shows a photographic printer 42 which utilizes the present invention in producing reprints. In the printer 42 of FIG. 3, film segments 12 and paper tab 14 are supplied from supply reel 44 over stationary roller 46, bale arm 48, and stationary roller 50 to a film cleaning station 52, where the film segments 12 are cleaned prior to printing. Film segments 12 and paper tab 14 then advance to the neghold assembly 54, at which the frames are initially previewed by light sensors to determine whether automatic exposure corrections are necessary, and then are advanced to a print gate, where light from lamp house 56 and drop cone assembly 57 is passed downward through the negative to expose photosensitive print paper (not shown) located within printer 42. In FIG. 3, print paper is fed from a light-tight supply magazine 58, into printer 42 and onto a paper deck (not shown). After exposure, the print paper is fed out of printer 42 into light-tight takeup magazine 60. After the film segments 12 and paper tab 14 have passed the neghold station 54, they are advanced over stationary roller 62 and bale arm 64 and stationary roller 66 to takeup reel 68.

In the preferred embodiment of the present invention shown in FIG. 3, floppy disk drive/controller 70 is attached to printer 42. Floppy disk drive/controller 70 reads data from the floppy disk produced at preparation station 10 during the initial tabbing of the film.

FIG. 4 shows a portion of neghold assembly 54 of printer 42. In FIG. 4 a 135-size film segment 12d has a first frame 12d-1 located at the print gate, a second frame 12d-2 located at the preview gate of the neghold assembly, and a third frame 12d-3 upstream of the preview gate. Frame 12d-1 is in position for printing. Light is passed downward through frame 12d-1 and onto the photosensitive paper (not shown) located within printer 42.

Positioned below frame 12d-2 is an array of sensors 74 which measure density of frame 12d-2 at a plurality of locations. These sensor measurements will be used in determining need for and the amount of automatic exposure corrections required when printing frame 12d-2.

FIG. 4 also shows a housing 72 containing two light sources 73a and 73b (such as lamps or light emitting diodes) which are used in the sensing of the holes in paper tab 14. Two corresponding sensors (not shown in FIG. 4 but designated "102a and 102b" in FIG. 5a) are positioned below paper tab 14, opposite light sources 73a and 73b, respectively. Sensor 102a is located adjacent the preview gate and sensor 102b is located adjacent the print gate. Sensor 102a signals the printer to take array density readings and also is utilized to count the number of holes per frame. Sensor 102b located adjacent the print gate signals the printer to stop the film feed because the frame is properly positioned at the print gate.

As shown in FIG. 4, housing 72 has a cut-away section 72' near the preview gate so that the print quantity, which is printed on the tab 14 as a three digit number, may be viewed while the frame is at the preview gate. In the example shown in FIG. 4, the three digit number "001" is visible, and indicates that the desired print quantity for frame 12d-2 is one.

Frame 12d-3 in FIG. 4 is the end of the strip, and therefore two holes 39 and 39a are located adjacent frame 12d-3. Frame indication hole 39 is aligned with the center of frame 12d-3, and end-of-strip hole 39a is immediately to the left of hole 39. The desired print quantity printed on tab 14 for frame 12d-3 is "410". In other words, the desired print quantity indicated is four hundred ten prints. As will be discussed in detail later this large desired print quantity causes printer 42 to stop and request vertification by the operator before frame 12d-3 is printed. This gives the operator the opportunity to make certain that the number of prints requested is correct and to also check frame 12d-3 to be certain that it is in printable condition. In that way, large numbers of waste prints are avoided.

Figure 5A:
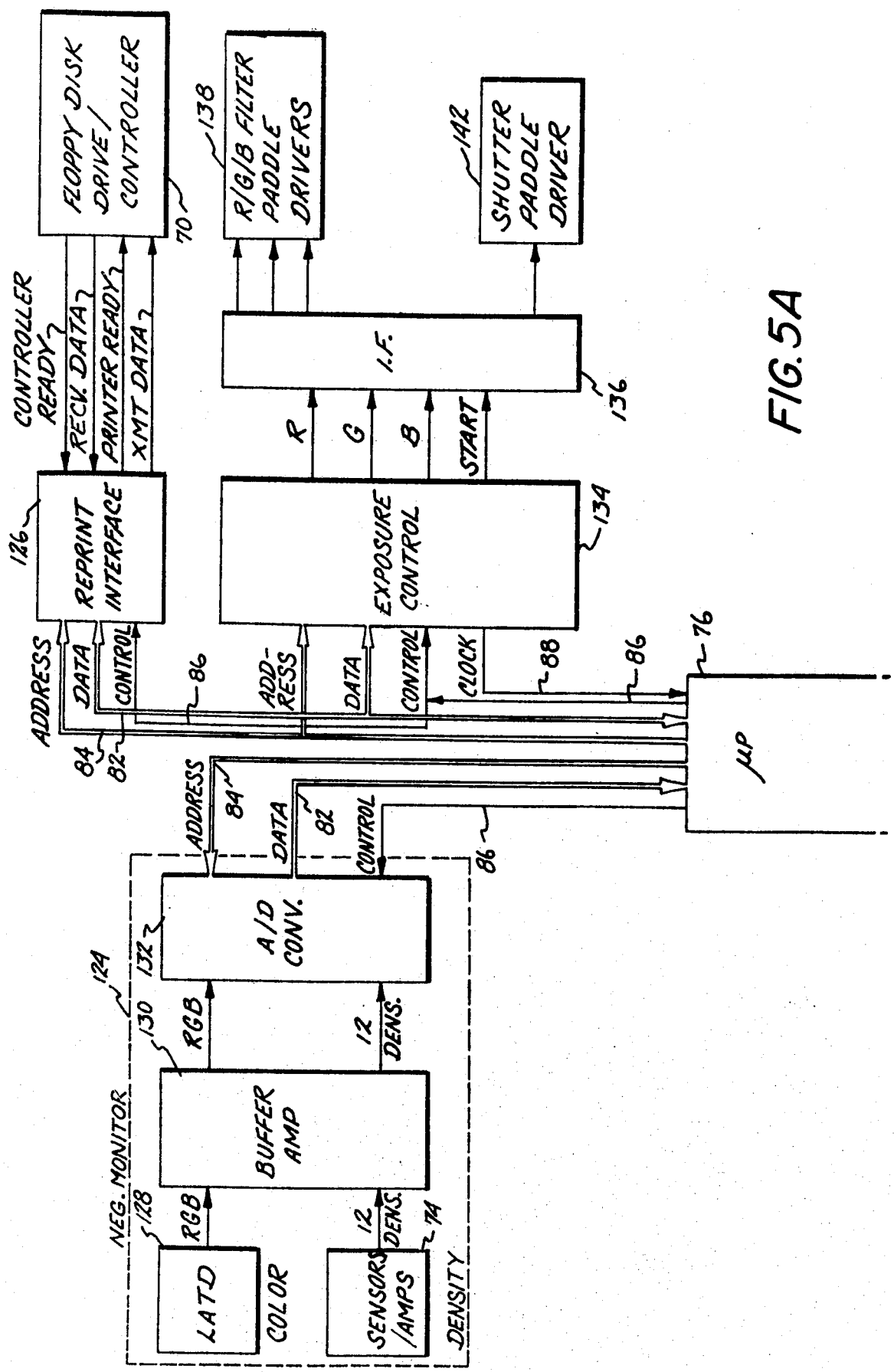
FIGS. 5A and 5B are an electrical block diagram of the photographic printer of FIG. 3.
Figure 5B:
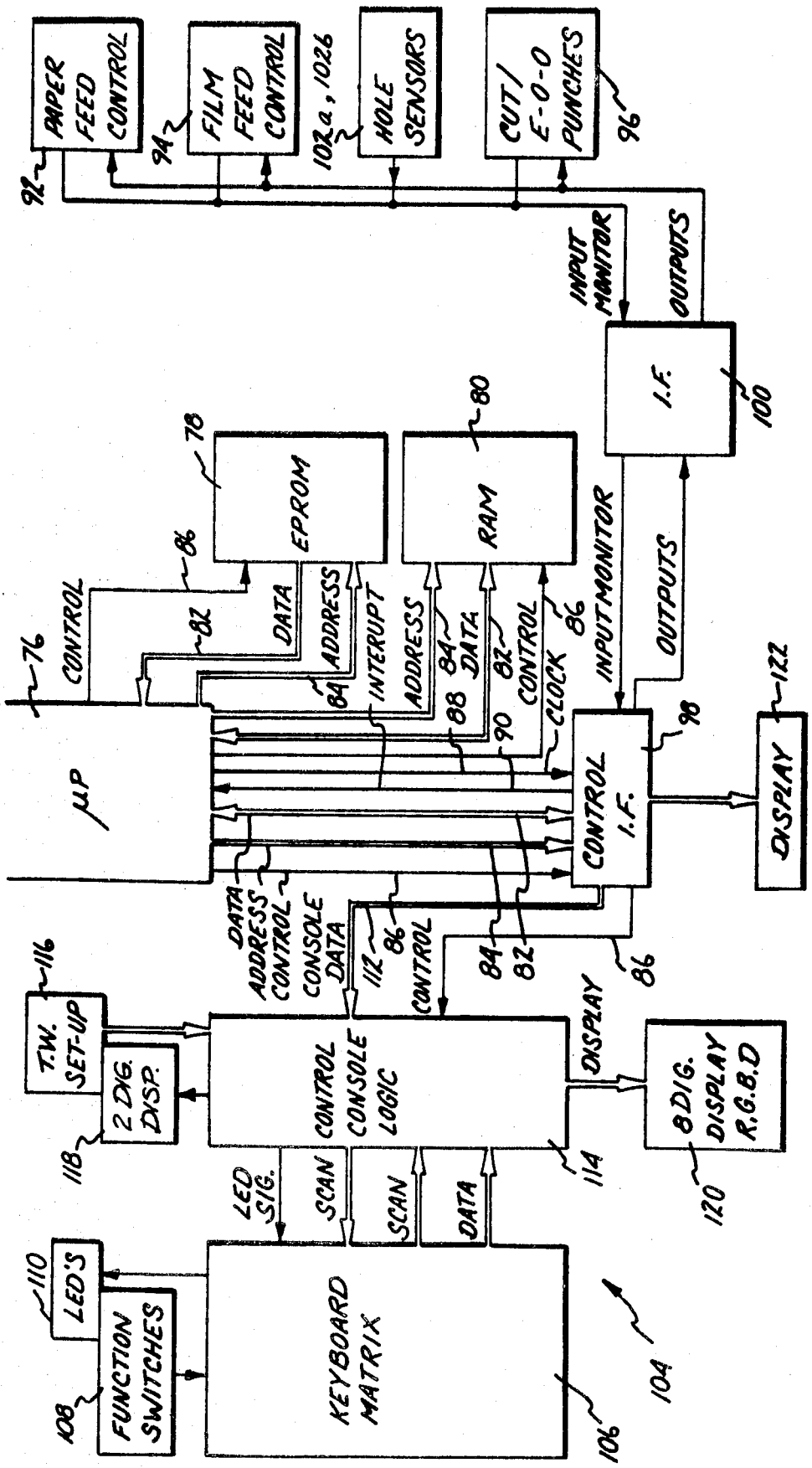

FIGS. 5A and 5B show an electrical block diagram of printer 42 shown in FIG. 3. Coordinating and controlling the operation of printer 42 is microprocessor 76, which in one preferred embodiment is an eight-bit microprocessor such as an Intel 8080A. Associated with microprocessor 76 are erasable programmable read only memory (EPROM) 78 and random access memory (RAM) 80. Microprocessor 76 communicates with the various portions of the control system through data bus 82, address bus 84, control bus 86, clock line 88, and interrupt lines 90.

In the embodiment shown in FIGS. 5A and 5B, microprocessor 76 directly controls the exposure control functions of the printer. In addition, microprocessor 76 coordinates the operation of paper feed control 92, film feed control 94, and cut/end-of-order punches 96 through control interface 98 and interface circuit 100. Input monitor signals are supplied to microprocessor 76, and output control signals are supplied to paper feed control 92, film feed control 94, and cut/end-of-order punches 96.

In the embodiments shown in FIGS. 5A and 5B, hole sensors 102a and 102b, which sense the punched holes in paper tab 14 at the preview and print gates, respectively, supply signals to microprocessor 76 through interface circuit 100, and control interface 98.

Microprocessor 76 receives control information entered by the operator of printer 42 through control panel or console 104 (shown in FIG. 6). Console 104 includes a keyboard 106 through which the operator can enter a wide variety of alpha-numerical control information. Among the control information which is entered through keyboard 106 is red, green, glue and overall density button corrections entered by the operator. In preferred embodiments, color balance setup parameters, slope, gamma factors, and other exposure control parameters are also entered through keyboard matrix 106. As shown in FIG. 5A, function switches 108 are monitored by microprocessor 76 through keyboard matrix 106. Light emitting diodes 110 are associated with function switches 108 and keyboard matrix 106, and depending upon which function or functions are selected, microprocessor 76 energizes the appropriate light emitting diode or diodes.

Microprocessor 76 communicates with console 104 through control interface 98. Console data lines 112 and control lines 86 interconnect control interface 98 with control console logic 114. Signals to and from keyboard 106 are routed through control console logic 114. In addition to keyboard 106, control console logic 114 also is connected to setup select thumbwheel switches 116, two digit print quantity display 118, and eight digit display 120. Thumbwheel switches 116 are used both in the initial storage of color balance setup data in random access memory 80, and also during normal first-run production printing to select the setup. As will be discussed in detail later, during reprint operation, the selection of setup is provided by data stored on a floppy disk which is read by floppy disk drive/controller 70.

FIG. 6 shows a preferred embodiment of control panel or console 104. Keyboard matrix 106, shown in FIG. 5B, includes the following keys which are shown in FIG. 6: "END-OF-ORDER", "MULT PRINTS", "0" through "9", "−", ".", "R", "G", "B", "D", "NO ADV" (no advance), "PASS", "PRINT", "ENTER", "SPACE", "CLEAR", "110", "126", "135", "ALPHA", "K1" through "K6", and "MACHINE CLEAR". Control console 104 also includes several function switches, including CORRECTION HOLD switch 108a, AUTO switch 108b, CLOCK switch 108c, AEC (automatic exposure correction) switch 108d, FILM ADVANCE switch 108e, and REPRINT CONTROLLER switch 108f, key-operated ACCESS switch 108g. SETUP thumbwheel switch 116, multiple print two-digit print quantity display 118, and eight-digit correction display 120 are also included on console 104. Key-operated ACCESS switch 108g, which limits access to certain functions of the machine so that only the lab manager or another authorized person may alter certain critical operating parameters of the printer. Operation of ACCESS switch 108g is described in further detail in a copending patent application Ser. No. 867,897 by J. Pone, filed Jan. 9, 1978, and assigned to the same assignee as the present application.

Light emitting diodes 110 are located adjacent AEC switch 108d, FILM ADVANCE switch 108e, and REPRINT CONTROLLER switch 108f to indicate when the functions actuated by these switches are ON. Additional light emitting diodes 110 are located below a transparent function code plate 121 which has printed thereon the names of various functions or operating modes of the printer. Depending upon which function is selected, the light emitting diode 110 adjacent that function is energized, and shines through transparent plate 121.

Eight-digit display 120 displays the selected button corrections for red, green, blue and overall density. These button corrections have been entered through keyboard 106, or have been supplied from the floppy disk by controller 70, and microprocessor 76 provides the appropriate drive signals to display 120 through control interface 98 and control console logic 114.

In the embodiment shown in FIG. 5A, microprocessor 76 also controls display 122 through control interface 98. Display 122, which is also shown in FIG. 3, displays a wide variety of information of importance to the operator. For example, during initial color balancing display 122 displays instructions of the steps to be performed by the operator. In another mode, display 122 preferably displays current information as to stored parameters, and automatic corrections being used. During normal operation, in either the first-run or reprint mode, display 122 displays setup number and name, or print exposure times, or error messages. As discussed later, one message displayed by display 122 indicates to the operator that the desired print quantity for the next frame to be printed exceeds a predetermined number.

Microprocessor 76 controls print exposures based upon stored data contained in EPROM 78, RAM 80, data received from control console logic 114, and sensor signals received from negative monitor circuitry 124 (FIG. 5B). In addition, when the printer is in the reprint mode of operation, additional data is received from floppy disk controller 70 through reprint interface circuit 126.

As shown in FIG. 5B, negative monitor circuitry 124 includes the density sensors 74, which provide measurement of density at a plurality of individual locations on the print. The signals from sensors 74 are produced when the negative is at the preview gate.

Negative monitor circuit 124 also includes large area transmission density (LATD) sensors 128, which provide red, green and blue LATD signals indicating the overall color content of the negative. LATD sensors 128 are located within the printer below the print gate.

Both the density signals from sensors 74 and the LATD signals from LATD sensors 128 are supplied to buffer amplifier circuit 130.

The LATD signals and the density signals are provided by buffer amplifier circuitry 130 to analog-to-digital converter 132. In a preferred embodiment, analog-to-digital converter 132 also includes multiplexers for multiplexing the twelve density sensor signals and multiplexing the three LATD signals. The signals are converted to digital signals, and are provided to microprocessor 76 over data bus 82.

Based upon the data which it receives, microprocessor 76 supplies data to exposure control 134. In one preferred embodiment, exposure control 134 is similar to the exposure control circuit shown in U.S. Pat. No. 4,140,391 by Laciak and Pone, which is assigned to the same assignee as the present application. Exposure control 134 supplies red, green, and blue exposure time control signals through interface circuit 136 to red, green, and blue filter paddle drivers 138. In addition, exposure control 134 supplies a start signal through interface circuit 136 to shutter paddle driver 142.

Figure 7A:
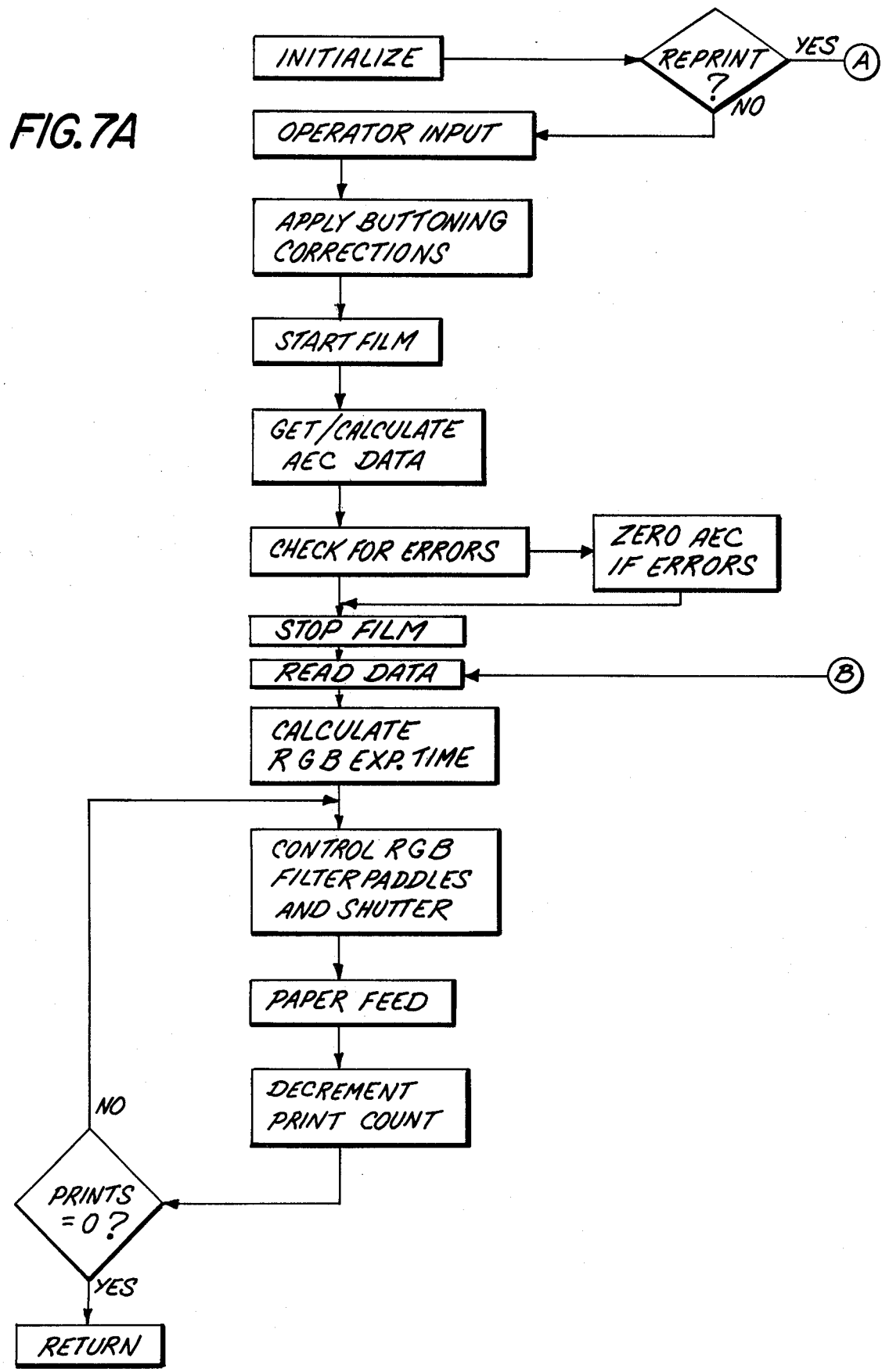
FIGS. 7A and 7B are flow diagrams of the operations performed by the photographic printer of FIG. 3 when producing reprints.

FIG. 7A is an operational diagram illustrating the operation of the control system of the photographic printer of FIGS. 5A and 5B for both first run production operation and reprint operation. At the beginning of each cycle, the conditions are initialized, so that the system is ready for a print cycle. Microprocessor 76 determines whether printer 42 is in a first run production or a reprint mode. In a preferred embodiment, circuitry (not shown) associated with the first run and reprint negholds, together with reprint controller switch 108f, provides an indication of which mode is being used.

Before discussing the reprint mode, which utilizes the present invention, the first run production mode will be discussed. In this mode, after determining that the printer is in the first run production mode, microprocessor 76 interrogates control console logic 114 to determine all operator inputs to be used during the print cycle. In the embodiment shown in FIGS. 5A and 5B, these operator inputs include the setup number which is selected by thumbwheel switches 116. Random access memory 80 contains color balance setup data to be used for each of a plurality of color balance setups.

In one preferred embodiment of the present invention, the color balance setup data stored in random access memory 80 includes the following information: film size; the message to be displayed on alpha-numerical display 122; red, green and blue aim points; gamma factors; slope centers; over/under slope values; color balance factors; density and color button increments; temporary color/density corrections; array calibration data for each film size; over/under reject levels; snow/beach scene (SNRA) value; and totals of average print times, total prints, and number of film synch errors. Some of this setup data is described in further detail in the following patents and copending patent applications, all of which are assigned to the same assignee as the present application: U.S. Pat. Nos. 4,149,799 by J. Pone and P. Seidel; 4,146,120 and 4,168,121 by J. Freier, R. Harvey, and J. Pone; Ser. No. 848,739 by J. Pone, filed Nov. 4, 1977; Ser. No. 848,738 by J. Pone filed Nov. 4, 1977; Ser. No. 862,733 by R. Laska, filed Dec. 21, 1977; and Ser. No. 867,897 by J. Pone, filed Jan. 9, 1978.

It should be understood, of course, that other information may be included within the color balance setup data stored. It should also be understood that in different photographic systems, not all of the information described above is stored as part of the color balance setup data. In most printers, however, the color balance setup data includes at least some of the information listed above, or similar information used in controlling red, green and blue exposures for a particular film type.

Microprocessor 76 then applies any buttoning corrections entered through keyboard matrix 106 by means of the "R", "G", "B", "D", "0" through "9", "−" and "." keys. These corrections alter the exposures for any and all of the color channels.

The photographic film feed is then started. This causes the frame which has been at the preview gate to be advanced to the print gate. It is this frame which will be printed during the print cycle.

Microprocessor 76 then gets any automatic exposure correction data from array sensors 74, the measurements for which were taken as the frame to be printed passed by the sensor array 74 during this or some previous film movement. It then calculates the appropriate automatic exposure correction data which is used in providing corrections for certain types of printing failures. Microprocessor 76 then checks for film data sequence (i.e. "film synch") errors and sets the automatic exposure correction data to zero if errors are found to exist.

At this point the negative frame to be printed has advanced to the print gate, hole 39 has been sensed by sensor 102b, and tab 14 and film 12 has been stopped. Print light is permitted to pass through the negative frame, and red, green and blue LATD signals are obtained from LATD sensors 128. During this LATD measurement, the shutter paddle which is positioned between the negative print gate and the photographic print paper is in position, so that no light impinges upon the print paper.

Microprocessor 76 then calculates red, green and blue exposure times based upon the color balance setup information, the automatic exposure correction data, the buttoning corrections which have been entered by the operator (if AUTO switch 108*b* is off so that printer 42 is in manual, i.e. operator controlled operation), and the LATD signals. Based upon the calculated red, green and blue exposure times, microprocessor 76 controls, through exposure control 134 and interface 136, the red, green and blue filter paddle drivers 138, and shutter paddle driver 142. Calculation and control of exposure times in one preferred embodiment is described in further detail in previously mentioned U.S. Pat. Nos. 4,140,391 and 4,168,120. After the exposures of all three color channels have been completed, as indicated by the shutter paddle being driven into the light path, paper feed control 92 is actuated to complete the entire operational cycle. The cut/end-of-order punches have been actuated at the beginning of the exposure. Microprocessor 76 returns to its initial state, and waits for the next print cycle to be initiated.

Figure 7B:
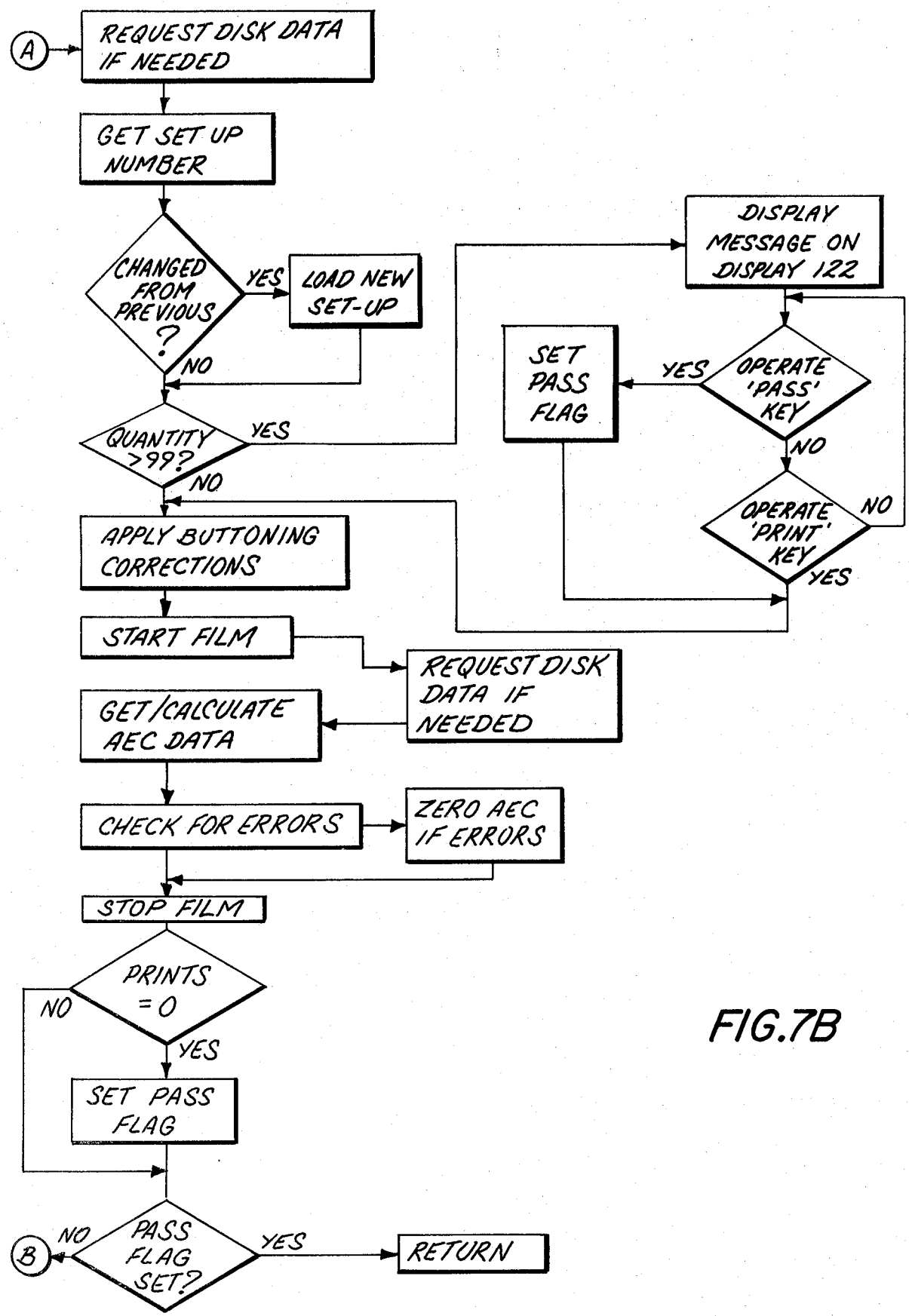

The operation of the printer system in the reprint mode is also shown in FIGS. 7A and 7B. In this mode, circuitry associated with neghold 54 indicates that the printer is in the reprint mode. During the first cycle of operation, microprocessor 76 requests data from floppy disk drive/controller 70 through reprint interface 126. In subsequent cycles, the disk data will already have been requested and will have been received by microprocessor 76 before the print cycle starts.

The disk data provided to microprocessor 76 from floppy disk drive/controller 70 includes the number of holes which should have been sensed for that frame, print quantity, density and color correction data, and setup number for the frame to be printed. The disk data may additionally provide a film size code for error checking purposes. Microprocessor 76 first gets the setup number which has been provided by floppy disk drive/controller 70 and determines whether this has changed from the previous cycle. If, the reprint system is in its first cycle, or if the setup number has changed from the previous frame which is printed, microprocessor 76 loads the new setup data which it retrieves from random access memory 80. This color balance setup data will be used in printing during this cycle. As a result, each negative frame is printed using the color balance setup which will provide best print quality. It further permits various strips of film of different film types but similar size to be attached on a single tab 14, since printer 42 automatically selects the proper setup based upon the data supplied from floppy disk drive/controller 70 for the particular negative frame.

It can be seen, of course, that the setup number can be stored on the floppy disk for each frame, or can be stored only for each frame where a change in setup is required. In this latter case, microprocessor 76 assumes that no change in setup is required unless it receives a new setup number from floppy disk drive/controller 70.

As a precaution to avoid large quantities of waste prints, after the setup has been loaded, microprocessor 76 determines whether the desired print quantity exceeds a preset number (which in the embodiment shown in ninety-nine). This preset number may be selected at the factory, or may be selectable by the operator of the printer. If the preset number is exceeded, microprocessor 76 causes a warning message to be displayed on display 122. After verifying the required quantity and film framing the operator may tell the printer to print that frame, to pass that frame without printing, or may modify the quantity or adjust film position, etc. before telling the printer to continue. However, as long as the quantity of prints requested is less than the preset number, microprocessor 76 continues with the reprint cycle, producing the requested quantity of prints FIGS. 7A and 7B show the operation of microprocessor 76 in detail with respect to the large print quantity protection. When the desired quantity received from reprint controller 70 exceeds the preset number (such as 99), microprocessor 76 first causes a message to be displayed on display 122. Microprocessor 76 then monitors the status of the PASS and PRINT keys until one or the other of these keys is actuated by the operator. Automatic operation of the printer will not continue until one of these two keys is depressed.

Once the message has been displayed on display 122, the operator first checks the desired print quantity (which is displayed on either display 118 or display 122, or both) and then the desired print quantity on tab 14 adjacent the frame located at the preview gate. In the particular embodiment shown multiple print display 118 has only two digits, so that the operator must assume that if the final two digits of the number on the tab agree with the two digits being displayed on display 118, the desired print quantity is in agreement. Alternatively, multiple print display 118 can have additional digits equal to the number of digits of the number printed on the tab, or other means of display may be provided such as via display 122.

Even if the number on the tab and the number displayed by displays 118 and 122 agree, the operator will typically check the desired print quantity against the print quantity indicated on the original order form or order envelope. This will indicate to the operator whether the desired print quantity was correctly entered at the preparation station.

Finally, if the desired print quantity is correct, the operator checks the frame to make certain that it is clean and in printable condition. Assuming that the print quantity is correct and the film frame is clean and in printable condition, the operator depresses the PRINT key, and the operation of the printer continues by advancing the frame to the print gate and printing that frame. Alternatively, if the quantity is correct the frame may be advanced to the print gate using the PASS key, framing may be verified, and the print cycle may be initiated by operating the NO ADV key followed by the PRINT key. The printer will then make the desired quantity of prints of that frame.

Yet another option open to the operator is to modify the print quantity and/or button corrections by selecting the manual operating mode and turning off the reprint controller switch 108*f*. The printer will then ignore the information that was sent by reprint controller 70, and allow the operator to enter all quantity, correction, and setup information. Actuating the PRINT key then causes the printer to make the manually selected quantity of prints.

On the other hand, if the correct print quantity is zero, or if the film is dirty or is otherwise in unprintable condition, or the color/density correction is questionable, the operator may depress the PASS key. When this occurs, microprocessor 76 sets a PASS flag and then continues with the normal operation. As will be described later, the setting of the PASS flag causes the film frame to be advanced to the print gate, but no prints are made.

The data received from floppy disk drive/controller 70 for the frame to be printed includes density and color correction data, which is typically in the form of desired buttoning corrections. These buttoning corrections are entered and calculated by microprocessor 76 for use in the reprint cycle instead of manually entered data from the control console.

Mircoprocessor 76 then starts the film advance by providing the proper outputs through control interface 98 and interface circuit 100 to film feed control 94. During the film advance, microprocessor 76 gets and calculates the automatic exposure correction data from sensors 74 and calculates the appropriate automatic exposure corrections. In addition, the signals from the hole sensor 102a as the tabbing material passes over it at the preview gate permit microprocessor 76 to count the number of holes per frame. (In the embodiment described above, a single hole indicates a frame, two holes at a frame signify the end of a strip, three holes at a frame indicate end of order, and four holes at a frame indicate end of reel.)

Also during the film advance, microprocessor 76 requests disk data for the next reprint cycle, if needed. This is based, of course, on the signals which have been received from hole sensor 102a. Signals from hole sensors 102a and 102b indicate to microprocessor 76 when the paper tab 14 and film 12 has advanced so that the next frame is aligned in the print gate. The corrections and the film position sequence information are checked for errors, and the corrections are set to zero if an error exists because the possibility of the print being good is higher if it is printed without corrections, than if it were printed with possibly erroneous corrections.

Microprocessor 76 checks the print quantity and sets the PASS flag if the print quantity is zero. Microprocessor 76 then checks to see whether the PASS flag is set. The PASS flag may have been set either by the operator depressing the PASS key as illustrated in FIG. 7B, or because the print quantity is zero as described above. In either case, microprocessor 76 returns to the beginning of operation without making any prints from the film frame then in the print gate.

If the PASS flag is not set, the reprint cycle then becomes the same as a first run production cycle. LATD measurements are made; red, green and blue exposure times are calculated; and red, green and blue filter paddles and the shutter paddle are controlled by microprocessor 76 to produce a print of the film frame in the print gate.

At the end of an exposure cycle a paper feed is initiated, and microprocessor 76 decrements the print count and checks to see if the print count is zero. If it is not zero, microprocessor 76 commences another exposure cycle by controlling the red, green and blue filter paddles and the shutter. In the embodiment shown in FIG. 7A microprocessor 76 does not recalculate exposure times in the case of multiple prints, but rather uses the previously calculated exposure times for each of the multiple print cycles. When the print count is finally decremented to zero, microprocessor 76 returns to the beginning of the operation. If the printer is operating in the automatic reprint mode, the next complete operational cycle is then automatically initiated.

It can be seen, therefore, that the present invention avoids the production of a large number of waste prints by permitting operator verification of large print quantities which exceed a certain predetermined number. In this manner, interruption of the normal operation of the printer is kept at a minimum, but operator verification and intervention is requested in those cases where the number of waste prints could be very high.

In a preferred embodiment of the present invention, the operator may, in addition to actuating either the PRINT key or the PASS key, return the printer temporarily to manual mode and turn off the reprint controller mode as has been described previously. This permits the operator to enter the correct number of prints if for some reason the print quantity received from controller 70 is incorrect.

If the operator decides to change the print quantity from that requested by the disk data, the operator first turns the AUTO switch 108b to the OFF position, and then turns the REPRINT CONTROLLER switch 108f to the OFF position. The printer is then in the manual mode, and operating independent of the reprint controller. The operator may enter the correct print quantity by depressing the MULT PRINTS key and then the appropriate numerical keys of keyboard 104 and an ENTER key. The operator then depresses the PRINT key, which causes the film frame to be advanced to the print gate and the prints to be made.

When REPRINT CONTROLLER switch 108f is turned on once again, microprocessor 76 determines that disk data is needed, and requests the data for the next frame. This places printer 42 and controller 70 back into synchronization. If automatic operation in the reprint mode is desired, AUTO switch 108b is turned on. In one embodiment, this automatically selects the reprint controller operating mode to eliminate errors. Normal operation of the printer in the reprint mode then continues until the printer again encounters a desired print quantity which exceeds the predetermined number.

In conclusion, the present invention is an improvement to automatic photographic reprint systems which greatly reduces the likelihood of wasted prints or undesired large quantities of prints, while interrupting the normal operation of the printer as little as possible. Although the present invention is described with reference to preferred embodiments, workers skilled in the art can recognize that changes may be made in form and detail without departing from the spirit and scope of the invention.

What is claimed is:

1. A photographic printer for printing photographic prints from photographic film frames, the photographic printer comprising:
   means for storing print quantity information indicative of desired print quantity for each of a plurality of film frames;
   means for sequentially advancing the film frames to a print gate at which photographic prints are printed;
   means for sequentially supplying signals based upon the stored print quantity information, which are indicative of the desired print quantity to be used in controlling the quantity of prints made from a film frame;
   means for interrupting operation of the printer prior to printing the film frame if the desired print quantity exceeds a predetermined number; and
   operator-controlled means for providing signals to reinitiate operation of the printer to print from the film frame either the desired print quantity or a print quantity different from the desired print quantity, including zero.

2. The photographic printer of claim 1 wherein the operator-controlled means comprises:

first means for providing a print signal which causes the printer to reinitiate operation and print the desired print quantity from the film frame; and second means for providing a pass signal which causes the printer to reinitiate operation but print no photographic prints from the film frame.

3. The photographic printer of claim 2 wherein the operator-controlled means further comprises:

third means for providing signals indicative of a modified print quantity; and fourth means for providing a signal to reinitiate operation of the printer and cause the printer to print the modified print quantity of photographic prints from the film frame.

4. The photographic printer of claim 3 and further comprising:

resynchronizing means for resynchronizing the means for sequentially advancing the film frame and the means for sequentially supplying signals indicative of desired print quantities after the third and fourth means have been actuated by the operator.

5. The photographic printer of claim 1 wherein the means for sequentially supplying signals supplies the signal indicative of the desired print quantity for the film frame prior to the film frame being advanced to the print gate, and wherein the means for interrupting operation of the printer interrupts operation prior to the film frame being advanced to the print gate.

6. The photographic printer of claims 1 or 5 and further comprising:

display means for displaying a message to the operator indicating the desired print quantity exceeds the predetermined number.

7. The photographic printer of claim 6 wherein the display means displays the message to the operator prior to the film frame being advanced to the print gate.

8. The photographic printer of claim 1 wherein the film frames are connected to an elongated tab.

9. The photographic printer of claim 8 wherein the tab has printed thereon proximate each film frame the desired print quantity for the film frame in human readable form.

10. The photographic printer of claims 1, 8 or 9 and further comprising:

means for displaying, prior to printing a film frame, an indication of the desired print quantity for the film frame if the desired print quantity exceeds the predetermined number.

11. A photographic system for printing photographic prints from photographic film frames, the system comprising:

a preparation station at which film segments containing at least one film frame are connected to an elongated tab, the preparation station including:

means for storing desired print quantities for the film frames; and means for printing on the tab proximate the film frames the desired print quantities in human readable form; and a photographic printer for printing photographic prints from the film frames, the photographic printer including:

means for sequentially advancing the elongated tab and the film segments to a print gate at which photographic prints are printed;

means for sequentially retrieving the stored desired print quantities; and means for allowing an operator to verify the desired print quantity prior to printing the film frame if the desired print quantity exceeds a predetermined number.

12. The system of claim 11 wherein the means for allowing an operator to verify the desired print quantity comprises:

display means for displaying a message to the operator indicating that the desired print quantity exceeds the predetermined number;

first operator controlled means for providing a print signal which causes the printer to print the desired print quantity of photographic prints from the film frame; and second operator controlled means for providing a pass signal which causes the printer to pass the film frame without printing the desired print quantity.

13. The system of claim 12 wherein the means for sequentially retrieving the stored desired print quantities retrieves the desired print quantity for each film frame prior to the film frame being advanced to the print gate.

14. The system of claim 13 wherein the display means displays the message to the operator prior to the frame being advanced to the print gate.

15. The system of claim 14 wherein the print signal causes the film frame to be advanced to the print gate and the desired print quantity of photographic prints to be printed; and wherein the pass signal causes the film frame to be advanced to the print gate but no photographic prints to be made.

16. The system of claim 15 and further comprising:

third operator-controlled means for providing signals indicative of a modified print quantity; and fourth operator-controlled means for providing a signal which causes the film frame to be advanced to the print gate and the modified print quantity of photographic prints to be printed.

17. The system of claim 15 and further comprising:

fifth operator-controlled means for selectively disabling and enabling the means for sequentially retrieving the stored desired print quantity.

18. The system of claim 17 wherein the fifth operator-controlled means is utilized to disable the means for sequentially retrieving the stored desired print quantity prior to operation of the third and fourth operator-controlled means.

19. The system of claim 18 and further comprising:

resynchronizing means for resynchronizing the means for sequentially advancing the elongated tab and the film segments and the means for sequentially retrieving the stored desired print quantities after operation of the third and fourth operator-controlled means and prior to operation of the fifth operator-controlled means to enable the means for sequentially retrieving the stored desired print quantities.

20. A photographic printer for printing photographic prints from photographic film frames, the photographic printer comprising:

means for sequentially advancing the film frames to a print gate at which photographic prints are printed;

means for sequentially supplying signals indicative of desired print quantities;

means for interrupting operation of the printer prior to printing the film frame if the desired print quantity exceeds a predetermined number;

means for displaying prior to printing a film frame, an indication of the desired print quantity for the film frame if the desired print quantity exceeds the predetermined number; and operator-controlled means for providing signals to reinitiate operation of the printer to print from the film frame either the desired print quantity or a print quantity different from the desired print quantity, including zero.

* * * * *